United States Patent [19]

Friedman et al.

[11] 4,019,016
[45] Apr. 19, 1977

[54] WELDING CONTROL SYSTEMS

[75] Inventors: Robert Friedman; Howard D. Lesher, both of Saugus, Calif.

[73] Assignee: Dimetrics, Inc., Sepulveda, Calif.

[22] Filed: Apr. 7, 1975

[21] Appl. No.: 565,517

Related U.S. Application Data

[63] Continuation-in-part of Ser. No. 421,397, Dec. 3, 1973, abandoned.

[52] U.S. Cl. .................. 219/125 R; 219/60 A; 219/135
[51] Int. Cl.[2] .................................. B23K 9/10
[58] Field of Search .......... 219/124, 125 R, 125 PL, 219/131 F, 60 A, 60 R, 61

[56] References Cited

UNITED STATES PATENTS

| | | | |
|---|---|---|---|
| 3,230,341 | 1/1966 | Blackburn | 219/125 R |
| 3,555,239 | 1/1971 | Kerth | 219/125 R |
| 3,619,552 | 11/1971 | Cape | 219/125 R |
| 3,646,309 | 2/1972 | Smith, Jr. et al. | 219/60 R |
| 3,657,511 | 4/1972 | Friedman et al. | 219/125 PL |
| 3,737,614 | 6/1973 | Paulange | 219/131 F |
| 3,777,115 | 12/1973 | Kazlquskas et al. | 219/60 R |
| 3,783,222 | 1/1974 | Gwin et al. | 219/125 R |
| 3,818,176 | 6/1974 | Brown | 219/131 F |
| 3,832,522 | 8/1974 | Arikawa et al. | 219/125 R |

*Primary Examiner*—J. V. Truhe
*Assistant Examiner*—Clifford C. Shaw
*Attorney, Agent, or Firm*—Ralph B. Pastoriza

[57] ABSTRACT

An electric arc welding system includes programming circuits for controlling the position of a welding torch on a carriage wherein the carriage is caused to move along in the direction of a weld path on a member to be welded. The programming circuits cause the torch to move back and forth across the weld path as the carriage moves parallel to the weld path, the excursion time of the torch and dwell time of the torch on either side of the path at the limits of its excursion constituting the selected position program. The torch thus follows a repetitive generally truncated sawtooth pattern. The welding current to the torch is connected into the programming circuits to be responsive to a selected program so that the level of current provided during the dwell times is different from the level of current provided during the excursion times. Additionally, the speed of wire feed for the torch can be made responsive to a selected position program so that the speed wire is fed is different during the dwell times from the speed wire is fed during the excursion times. Torch centering and arc voltage controls are included, the overall system functioning to provide welds of greatly improved quality.

5 Claims, 10 Drawing Figures

WELDING CONTROL SYSTEMS

This application is a continuation-in-part of our co-pending application Ser. No. 421,397 filed Dec. 3, 1973 and entitled WELDING CONTROL SYSTEMS, now abandoned.

This invention relates generally to welding operations and more particularly to automatic welding control systems for improving the quality of continuous welds along weld path.

BACKGROUND OF THE INVENTION

Automatic control of electric arc welding is well known. Generally, such systems include a carriage and track arrangement for moving a welding torch along a weld path and simultaneously supplying the welding torch with low frequency pulsed current. The carriage speed can be adjusted to a desired value and the level of the weld current can similarly be adjusted depending upon the materials involved to be welded.

In the case of pipe welding, the track structure supporting the carriage is generally circular so that the carriage can crawl around the track in a circumferential direction to cause the torch to follow a circular weld path.

In most of the above types of welding operations, the torch is mounted to the carriage for back and forth movement across the weld path as the carriage progresses in a direction parallel to the weld path. This action assures that all areas of the weld path will be heated to provide a fairly reliable weld seam. In present day automatic welding equipment, the back and forth motion is normally effected by a cam arrangement on the carriage and generally follows a sinusoidal pattern. In this respect, a wire feed system for providing filler is mounted on the same torch frame support so that the wire feeding will follow the motion of the torch.

An example of a track and carriage structure particularly suitable for pipe welding is shown and described in our copending Pat. application, Ser. No. 414,286 filed Nov. 9, 1973.

BRIEF DESCRIPTION OF THE PRESENT INVENTION

The present invention has to do with automatic arc welding equipment of the foregoing type wherein specific improvements in the electronic circuitry controlling movement of the torch along a weld path as well as the welding current and rate of wire feed are incorporated. Such controls result in a weld of greatly improved quality over those heretofore obtainable with equipment presently available.

More particularly, the present invention comtemplates a welding system such as a pipe welding structure wherein the torch position is programmed to follow a repetitive generally truncated sawtooth pattern. The dwell time to the left and right sides of the weld path can be controlled as well as the time for excursion of the torch between its excursion limits. A fundamental feature of the present invention is making the low frequency pulsed current a function of the torch position by rendering control of the current to the torch responsive to a selected torch position program.

In addition to the foregoing, the present invention provides for automatic wire speed feed control in accord with a selected program. Further, the welding current levels and rate of wire feed can be automatically controlled by the carriage speed and carriage position respectively.

Further features of the present invention include accurate centering means for the torch which includes a manually operable vernier control to enable an operator to track accurately a weld path should any misalignment occur, and an improved torch arc voltage control.

BRIEF DESCRIPTION OF THE DRAWINGS

A better understanding of the invention will be had by now referring to the accompanying drawings in which.

DETAILED DESCRIPTION OF THE INVENTION

Figures 1, 2, 3:
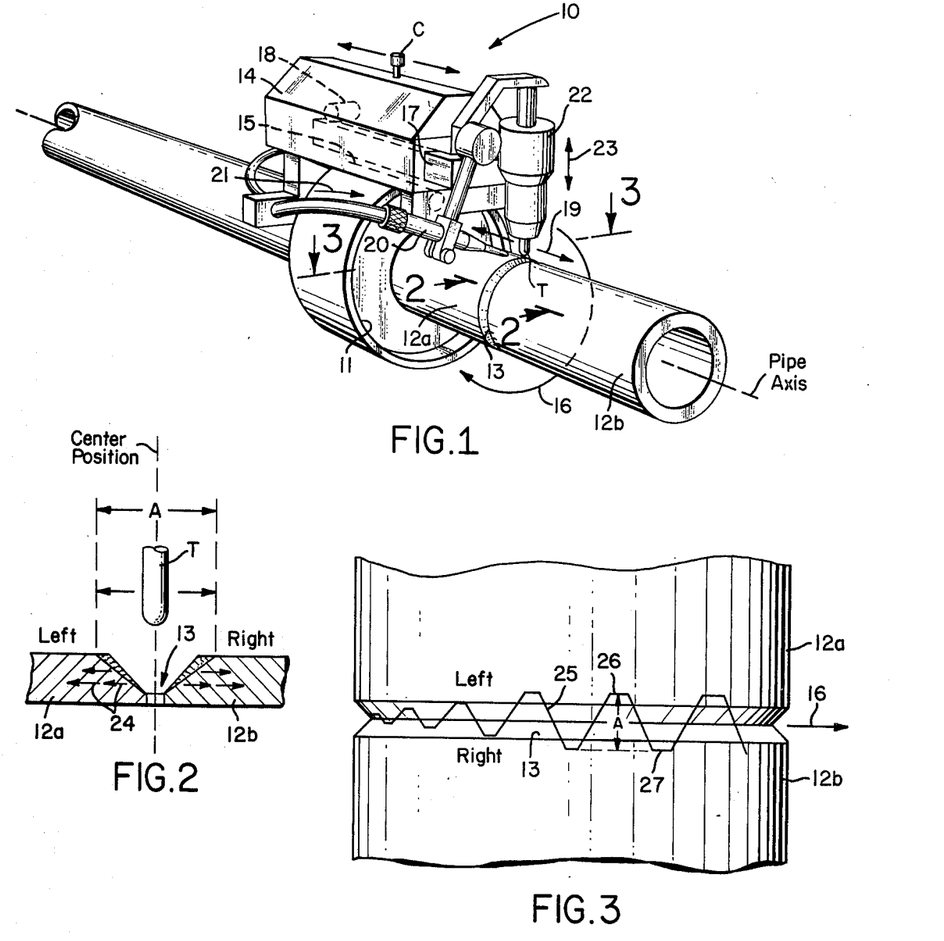
FIG. 1 is a perspective view of a pipe welding system incorporating the improved features of the present invention.
FIG. 2 is an enlarged, fragmentary cross-section of the pipe section of FIG. 1, taken in the direction of the arrows 2—2.
FIG. 3 is an enlarged, fragmentary plan view of the pipe section weld path taken in the direction of the arrows 3—3 of FIG. 1.

Referring first to FIG. 1, there is designated generally by the numeral 10 an automatic electric arc pipe welding system incorporating the improved control features of the present invention. The mechanical portions of the system of FIG. 1 are fully set forth and described in our previously referred to copending patent application wherein the structure is particularly suited for pipe welding. It should be understood, however, that the principles of the present invention are applicable to welding systems wherein the weld path is other than circular, such as rectilinear, for example. In either event, the system will include an appropriate track for supporting a carriage which carries the welding torch.

For purposes of the present invention, the preferred embodiment will be described in conjunction with a pipe welding structure such as that illustrated in our referred-to, copending application.

Thus, as shown in FIG. 1, the system includes a circular track 11 arranged to be secured about a pipe section 12a. In the example shown, another pipe section or stem 12b is to be welded to the end of the pipe section 12a and in this respect there is defined a circular weld path 13.

A carriage 14 is coupled to the track 11 and includes a carriage motor designated by the dashed lines 15 for moving the carriage along the track at a given speed. Essentially, the carriage revolves about the pipe axis as indicated by the arrow 16.

A welding torch T is carried on a torch frame 17 mounted to the carriage 14 for excursion movement back and forth across the path 13 in a direction perpendicular to the direction of motion of the carriage. This back and forth excursion motion is indicated by the double-headed arrows 19.

A wire feed servo mechanism 20 is shown carried on the torch frame 17 so as to move along with the torch T and provide proper filler during a welding operation. The rate or speed at which wire is fed is indicated by the arrow 21.

The system of FIG. 1 further includes an arc voltage servo 22 capable of moving the torch T towards and away from the surface of the member to be welded. This motion is indicated by the double-headed arrow 23 of FIG. 1.

Finally, there is shown in FIG. 1 a vernier control C which may be manually operated during a welding operation to assure that the center of the back and forth excursion of the torch coincides with the center of the weld path throughout the welding operation.

Basically, the present invention has to do with circuits which enable programming of the various motions of the torch T and utilizing the selected program of the torch position to automatically control the welding current level and wire feed speed in such a manner as to provide an improved quality weld.

As described heretofore, it is known to automatically move a welding torch back and forth across a weld path as the torch is moved along the path in order to effect a desired weld. As also mentioned, such back and forth motion is normally sinusoidal and while different welding current levels have been applied during the motion to provide a pulsed current control, there has heretofore never been any specific relationship between the applied welding current level and torch position. A fundamental feature of this invention as mentioned is the control of the low frequency pulsed welding current level by the torch position.

The desirability of the foregoing type of control will be evident by referring to FIG. 2, wherein the weld path 13 is illustrated in cross section between the walls of the pipe sections 12a and 12b. If the torch T is moved across the weld path in a back and forth manner as described in FIG. 1, its excursion time and dwell times to the left and right of the weld path can be adjusted to provide a desired heating of different areas of the weld path. Thus, rather than a sinusoidal motion, back and forth, if a dwell time at the extreme limits of the excursion is provided, heat dissipation is greatly enhanced because of the thicker areas of the pipe walls at the extremes of the excursion. The dissipation of this heat is illustrated by the small arrows 24. It can be appreciated that in the absence of a dwell time, the center portion of the path may absorb too much heat with the result that a "dripping down" of the molten metal occurs tending to form an annular interior bead at the weld seam. In fact, there may actually be penetration through the seam leaving undesired openings.

Referring to FIG. 3, the path followed by the torch in accord with the present invention is illustrated wherein it will be noted that the amplitude of excursion is caused to gradually build up at the start of the welding operation to a desired amplitude A. The excursion of the torch from left to right is shown by the line 25 and the left and right dwell times are indicated at 26 and 27. The build up of the amplitude in a gradual manner as shown is desirable since at the start of the welding operation, the pipe sections are cold. There is thus not a risk of applying too much heat at the center portion of the path when starting the welding operation. As the build up occurs, heat is uniformly distributed over the weld area and at the programmed amplitude, the welding continues around the complete weld path. Termination of the welding occurs in a similar manner by letting down the amplitude gradually. This sequence provides a very high quality weld.

Figure 4:
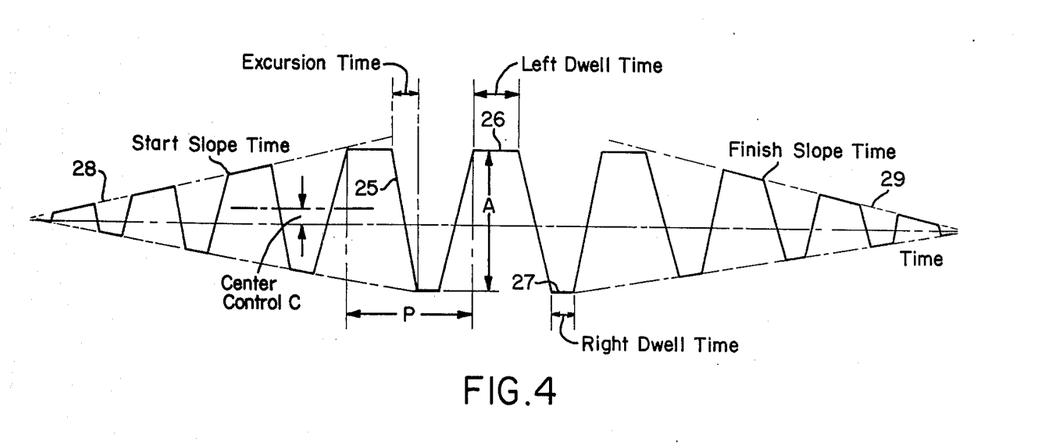
FIG. 4 illustrates one example of a programmed torch movement in effecting a continuous weld about the pipe section of FIG. 1.

FIG. 4 illustrates in greater detail the manner in which the torch position and movement may be programmed in accord with this invention. Thus, the start of the amplitude build up is defined by programmed start slope lines indicated at 28. The programmed amplitude is again indicated by the letter A in the central portion of FIG. 4, it being understood that this amplitude and wave form will be maintained over the weld path. The letting down of the amplitude at the finish is illustrated by the finish slope lines 29.

Also illustrated in FIG. 4 is the excursion time defined by the slope of the line 25 which may be adjusted, the left and right dwell times 26 and 27, each of which may individually be adjusted, and the overall period of the truncated sawtooth wave form indicted at P. Finally, there is shown the centering control adjustment wherein by moving the vernier centering control knob C described in FIG. 1, there effectively results a shift of the entire wave form illustrated in FIG. 4 up or down relative to the horizontal axis which defines the exact center of the weld path 13.

In accord with important features of this invention, not only is the torch movement programmed, as described in FIG. 4, but the welding current supplied to the torch is made to be a function of the program; that is, the position of the welding torch. Further, the wire feed of the filler wire can also be made a function of the selected program of movement of the torch so that precisely the correct amount of filler is supplied in accord with the torch position and welding current.

Figure 5:
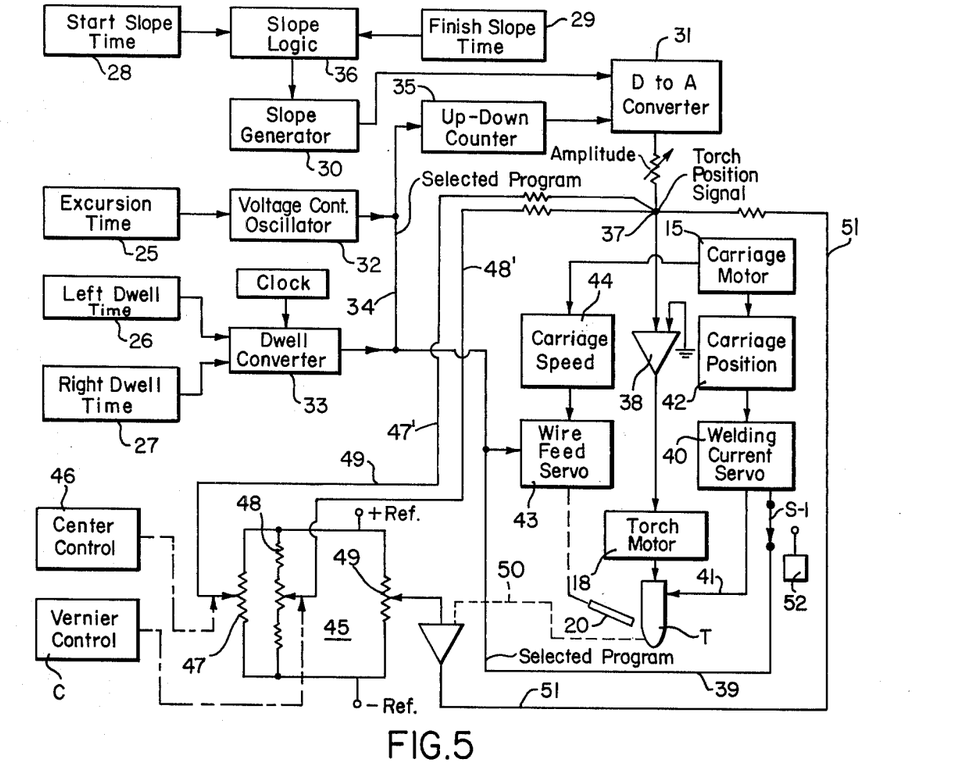
FIG. 5 is a block diagram of basic electronic components for programming the torch position for the system of FIG. 1.

The manner in which the foregoing features are realized as well as the manner of providing a desired program for torch movement will now be described with respect to FIG. 5. In FIG. 5, the various blocks which provide programmed in adjustments are designated by the same numerals utilized in the previous drawings for indicating such adjustments.

Thus, referring to the upper left portion of FIG. 5, the blocks designated excursion time 25, left dwell time 26 and right dwell time 27 enable an operator to set in these parameters. At the top of the Figure are shown the start slope time control 28 and finish slope time control 29.

A slope generator 30 has its output connected to a D to A converter 31. The excursion time is applied to a voltage controlled oscillator 32. while left and right dwell times pass into a dwell converter 33, controlled by a clock to hold the torch at the left and right extremes of the excursion for the respective set in dwell times. The outputs from the voltage control oscillator 32 and dwell converter 33 pass to a common line 34 which carries a signal in accordance with the selected program. This signal is fed into an up/down counter 35 also passing into the digital to analog converter 31.

The slope generator 30 is controlled at the start and finish to gradually increase and decrease respectively by the slope logic block 36.

The output of the D to A converter 31 passes through an amplitude control A, wherein the desired amplitude of the excursion is set in and thence to a junction point 37 at which a torch position signal is defined. The various blocks and controls described thus far to provide this signal constitute a programmed torch position signal generating means, the generated signal constituting a selected program at the junction 37 and passing through a positive error amplifier 38 to the torch motor 18. The torch motor 18 will thus move the torch in accord with the programmed signal, as will be subsequently described in greater detail, to provide the repetitive generally truncated sawtooth path described in FIG. 4.

In order to control the welding current supplied to the torch in accord with the selected program, the common lead 34 in the center of FIG. 5 includes a branch lead 39 passng the signal containing information relating to the excursion time and left and right dwell times to a welding current servo 40. This block is shown to the upper right of the torch T in the right hand portion of FIG. 5 and includes a switch S-1 the purpose for which will become clearer as the description proceeds. In the closed position of the switch as shown, the welding current is controlled by the selected program from the signal on the line 39 to provide welding current to the torch T on an output lead 41.

The welding current servo 40 can also be controlled in accord with a further feature of this invention by the actual position of the carriage along the welding path. This control is indicated by a carriage position means 42 and the manner in which the level of welding current is controlled by this carriage position means 42 will also be subsequently described.

Similar to the welding current control in accord with the selected program, the wire feed rate is also controlled by a wire feed servo shown by the block 43 to the upper left of the torch T connected to receive the signal on the branch line 39. In addition, the speed at which wire is fed to the torch as filler can be controlled by a suitable carriage speed means indicated by the block 44 in turn controlled by the carriage motor 15.

Referring now to the lower left portion of FIG. 5, the center control means described in conjunction with FIG. 4, which enables accurate alignment of the center position of the torch half-way between its excursion limits with the center of the weld path, is shown at 45. This circuit comprises a main center control shown as block 46 operating a potentiometer resistor 47 while the heretofore referred to vernier control C operates a vernier potentiometer resistor 48. These potentiometers connect in parallel between plus and minus reference voltages as shown. The signals tapped off resistances 47 and 48 pass through scaling resistances in leads 47' and 48' respectively to the junction point 37.

A feedback signal responsive to the torch position is provided by feedback potentiometer 49 connected between the plus and minus reference voltages and having a tap operated by movement of the torch T as indicated by the dashed line 50. This feedback signal is passed along a feedback line 51 to the junction point 37. Essentially, movement of the center control potentiometer indicated by the block 46 and resistance 47 will provide a command position signal at junction 37 to move the torch to one side or the other of the center of the weld path over a fairly wide amplitude; for example, over a distance of one and one half inches. The vernier control C and associated tap on resistance 48, on the other hand, enables a very fine degree of control of the centering of the torch T relative to the center of the weld path.

More particularly, it is to be understood that when there is no signal at the junction point 37, there will be no signal applied to the torch motor and thus the torch T will stay in its particular position. Consider first the situation before a welding operation begins and thus before any programmed signal appears at junction 37. Assume further that the torch is not at the exact center of the desired weld path. Since there is no position signal at the junction point 37, the voltage signal provided from the center control position potentiometers 47 and 48 on leads 47' and 48' is exactly balanced by the feedback signal derived from the potentiometer 49 along lead 51 connecting to the junction point 37. In other words, the voltage from the center controls is exactly cancelled by the voltage from the feedback potentiometer 49 and thus the torch remains stationary.

A command voltage signal is now manually applied through the center control 46 to the potentiometer 47 and thus to the junction point 37. This command position signal will pass through the error amplifier 38 to the torch motor 18 and move the torch towards the center of the weld path. As the torch T moves, it will change the feedback signal in line 51 by moving the potentiometer 49 until the feedback signal exactly balances the command position signal at the junction point 37. When the command position signal is thus nulled, so that no position signal effectively appears at 37 the torch motor will stop.

If the torch is not precisely centered on the center of the desired weld path, slight further adjustments can be affected by the vernier control potentiometer 48.

Precisely the same type of feedback servo control of the torch takes place when the selected programmed signal from the D to A converter and amplitude control A is applied to the junction point 37. This programmed signal will cause motion of the torch in the desired truncated sawtooth pattern, the movement of the torch continuously changing the feedback control signal in a direction to tend to null the programmed signal so that essentially the error signal; that is, the difference between the programmed signal applied at the junction 37 and the feedback signal applied at this point through lead 51 after passing through the error position signal amplifier 38 is the only signal that drives the torch motor.

The described centering control is a useful feature in the present invention as it enables the operator by means of the slider control C constituting the vernier control to accurately maintain the axis of symmetry of the truncated sawtooth pattern on the exact center of the weld path during a welding operation in the event that there should be some physical misalignment between the carriage guiding tracks and the actual weld path on the members to be welded.

It will be recalled that there is provided a switch S-1 at the input to the welding current servo 40 in FIG. 5. The other position for this switch connects to a low frequency pulsed mode generator 52 in the event that it is desired to supply welding current in accord with a particular program completely independent of the position of the torch. In other words, the switch S-1 provides an option of either having the welding current directly tied into the selected program so that it is synchronized to movement of the torch or alternatively, supplied in accord with a completely separate program as provided by the generator 52.

Figure 6:
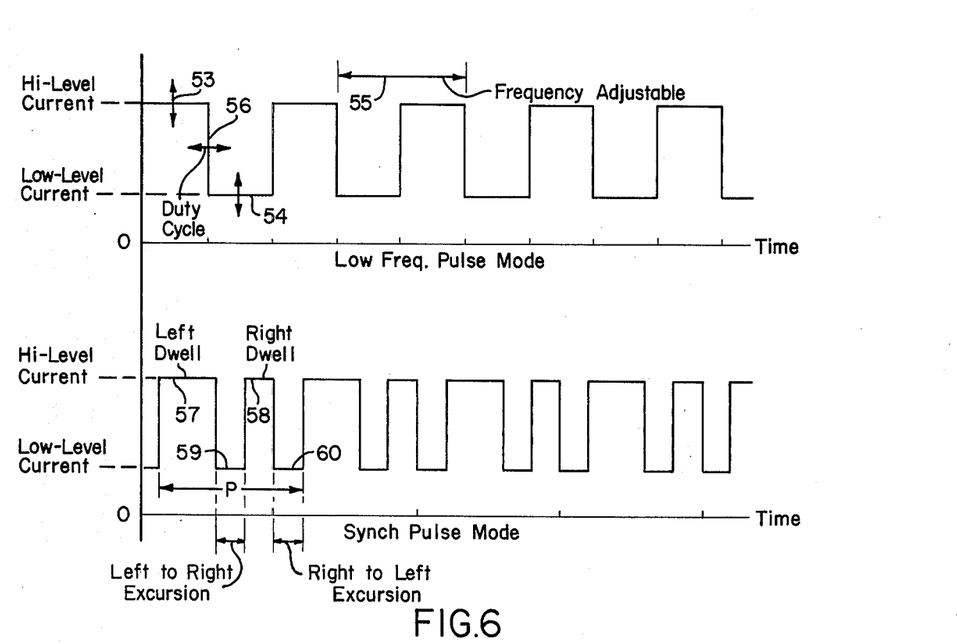
FIG. 6 illustrates two different wave forms of low frequency welding current which may be provided in accord with the invention.

The foregoing controls of the welding current will better be understood by now referring to FIG. 6 wherein the top wave form represents a low frequency pulsed current as provided by the generator 52 of FIG. 5 when the switch S-1 is moved to a position connecting to the block 52.

Essentially, the low frequency pulse mode current is provided at two levels, indicated high level and low level currents. The high level current is adjustable as indicated at 53 and is sometimes referred to as the "welding current" while the low level current is adjustable as indicated at 54 and is sometimes referred to as the background current.

The frequency of alterations between the high level and low level can be controlled as indicated by the period line 55. In addition, the percentage of time of application of the high level current over a given period; that is, the duty cycle, can be adjusted as indicated by the double-headed arrow 56.

Referring now to the lower wave form of FIG. 6, there is shown the high and low level currents supplied to the torch when the welding current servo 40 is synchronized to the selected program of torch movement. Thus, in this mode of operation the high level current is provided during the left dwell and right dwell times as indicated at 57 and 58. On the other hand, the low level current is provided during the excursion times as indicated at 59 and 60. It will thus be evident that the degree of heat applied to different areas of the weld path can be very carefully and completely automatically controlled by synchronizing the application of the high and low level currents to the selected program of torch movement.

It will be recalled from the discussion with respect to FIGS. 2, 3 and 4 that it is desirable to avoid overheating of the center portion of the weld and thus it is desirable to have only a low level welding current applied during excursion of the torch. On the other hand, at the thicker portions of the the pipe walls towards the limits of the excursion wherein the dwell times occur, it is desirable to provide the higher current level. Since the individual left and right dwell times can be controlled as well as the time of excursion, it will be clear that very accurate control of heating of the weld can be realized.

Figure 7:
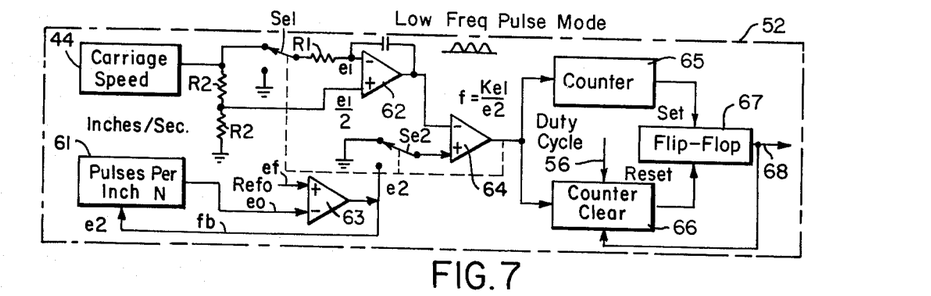
FIG. 7 is a block diagram of a system for providing welding current as shown by the upper wave form of FIG. 6.

Referring now to FIG. 7 there is illustrated in greater detail a block diagram of the low frequency pulse mode generator 52 providing the upper wave form of FIG. 6. While as previously stated, the low frequency pulse mode of providing welding current is independent of the torch position as programmed, it is normal practice to synchronize the current to the carriage speed carrying the torch along the weld path. The particular circuit of FIG. 7 enables automatically the conversion of the carriage speed normally give in inches per second into a desired low frequency pulse mode welding current in frequency of pulses per second. In FIG. 7, the block 61 indicates the set-in number of pulses per inch and also provides an analog voltage proportional to pulses per inch. Block 61 is a multiplying digital to analog converter with a thumb wheel switch to set in the number of pulses per inch N. The output of block 61 is shown as $e_o$ and feeds into the negative input of a differential amplifier 63. The positive input of amplifier 63 is supplied with a constant reference voltage $e_f$.

The output of amplifier 63 is shown as $e2$ and is inversely proportional to the pulses per inch N. This inverse relationship is obtained as follows:

The output voltage $e2$ from amplifier 63 is fed back to the digital to analog converter block 61 on feedback line fb as a multiplier voltage so that the output signal $e_o$ is given by:

1. $e_o = Ke_2N$ where K is a constant of proportionality.

The differential amplifier 63 drives its output $e2$ to make $e_o$ equal to the reference voltage $e_f$; that is, any difference in the output voltages $e_f$ and $e_o$ generates $e2$ which through the feedback line fb moves $e_o$ in a direction to equal $e_f$. Therefore 2. $e_o = e_f$ and from (1) above, (2) $e_o = e_f$ $\qquad$ and from (1) above, $$e2 = \frac{e_f}{KN}.$$

Since $e_f$ is a constant reference voltage, $e2$ is thus inversely proportional to the pulses per inch N.

The carriage speed block 44 in FIG. 7 constitutes a simple digital to analog converter to provide an output voltage $e1$ directly proportional to the carriage speed in inches per second. This voltage $e1$ is passed through solid state switch S$e1$ and resistance R1 to the input of an integrating amplifier 62. One half the same input voltage $e1$ is taken from a voltage divider made up of resistances R2 and passed into the + input of the integrator.

The output of integrator 62 is passed into the negative input of a high gain amplifier or comparator 64. The positive input to comparator 64 receives the voltage $e2$ when a second solid state switch S$e2$ is closed on this terminal. The opening and closing of switches S$e1$ and S$e2$ is controlled by the output from the comparator 64, the switching taking place at a frequency $f$ determined by the ratio of $e1/e2$. Since $e1$ is proportional to the carriage speed in inches per second, and $e2$ is proportional to 1/pulses per inch, $e1/e2$ is proportional to pulses per second.

The manner in which the foregoing takes place will now be described.

Assume the switches S$e1$ and S$e2$ are in the positions shown so that $e1$ is applied to the negative input of the integrator 62 and ground is applied to the positive input of comparator 64.

At this point in time, the output of integrator 62 will be a ramp moving downwardly and when it crosses zero so that the input to the negative terminal of comparator 64 is below ground, the output of 64 will become positive to thereby actuate switches S$e1$ and S$e2$. S$e1$ switches to ground and S$e2$ applied voltage $e2$ to the positive input of comparator 64.

When S$e1$ moves to ground, the integrator will integrate the voltage $e\frac{1}{2}$ applied to the positive input thereby generating an up ramp signal which is passed to the negative terminal of the comparator 64. When this ramp exceeds the $e2$ input to 64, the output of 64 becomes negative to switch switches S$e1$ and S$e2$ back to their original positions. The voltage in the capacitor of the integrator then discharges resulting in a down ramp and when this down ramp crosses zero, the process is repeated as described above.

The switches Se1 and Se2 are actually solid state switches responsive to a positive voltage from comparator 64 to switch from the position shown to ground and e2 respectively and responsive to a negative voltage from comparator 64 to switch back to e1 and ground respectively.

The intergrating amplifier 62, feedback amplifier 63, wherein the block 61 is in the feedback path, and the high gain amplifier or comparator 64 make up essentially a voltage controlled oscillator wherein the output frequency is proportional to an input voltage derived from the analog voltage signals from the blocks 44 and 61.

If the voltage e2 is considered constant for the moment, an increase in the voltage e1 will result in a steeper slope in the ramp which in turn essentially results in an increase in the frequency of the ramp wave form indicated. On the other hand, if e1 is considered constant for the moment and e2 is increased, the voltage ramp continues for a greater distance before reversing on its down side thereby effectively resulting in a decrease in the frequency.

The switches Se1 and Se2 alternately connect to the voltages e1 and e2 so that the resultant output frequency from the amplifier 64 or comparator is proportional to e1/e2. Since e1 is a function of inches per second while e2 is a function of the reciprocal of pulses per inch this output frequency is proportional to pulses per second all as described heretofore.

These pulses per second from the amplifier 64 are passed to counters 65 and 66 which will control the low and high current levels for a given length of time making up the period. The counter 65 by way of example could be a ring counter which will count one hundred pulses and then reset itself and count another hundred pulses to define a given period which of course is determined by the frequency from the amplifier 64. Each time the counter 65 completes counting of one hundred pulses, it sets a flip flop 67 in one state.

The counter 66 in turn is provided to count a given number of pulses less than one hundred, this number being determined by the duty cycle input 56. When counter 66 reaches this specific count which is a fraction of the overall count of one hundred pulses by the counter 65, it resets the flip flop 67. When the flip flop 67 is reset it also clears the counter 66.

The output of the flip flip circuit on lead 68 thus constitutes a control signal for controlling the desired set-in durations of the high level current when the flip flop is in one state and low level current when the flip flop is in its other state as defined by the upper wave form of FIG. 6.

Figure 8:
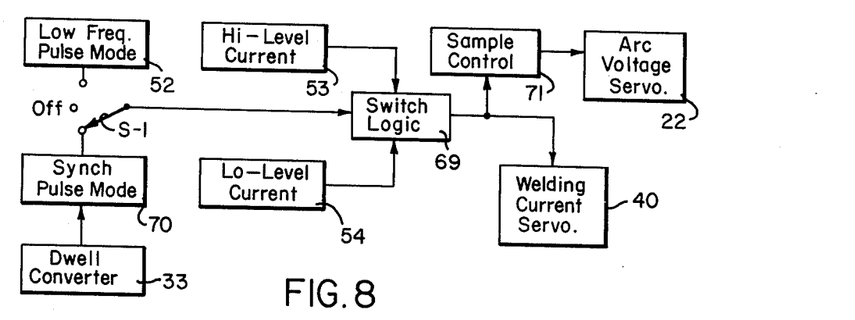
FIG. 8 is a block diagram of a welding current control means.

The manner in which the foregoing occurs as well as the manner in which the weleging current can be synchronized to the selected program as described heretofore in FIG. 5 is shown in FIG. 8. Essentially, FIG. 8 constitutes a welding current control means and includes in addition to the low frequency pulse mode generator 52 suitable high level current and low level current supplies 53 and 54 both feeding into a switch logic 69. In FIG. 8, the switch S-1 heretofore referred to in FIG. 5 is shown removed from the terminal for the low frequency pulse mode 52 and positioned on the synchronizing pulse mode circuit shown by block 70 and controlled in accord with the selected program from the dwell converter 33. Also shown in FIG. 8 is an arc voltage servo control for the arc voltage servo 22. This control comprises a block 71 which samples arc voltage during the high current level passed from the switch logic 69 to the welding current servo 40 periodically to control the position of the torch in a manner to hold the arc voltage constant. Further details of this control will be described subsequently.

Assuming first that the switch S-1 is connected to the low frequency pulse mode generator 52 in FIG. 8, the switch logic 69 is simply switched in accord with the output signal from this generator to pass the high level and low level current to the welding current servo 40 in accord with the upper wave form of FIG. 6 as described.

If the switch S-1 is thrown to the position shown to connect to the synchronizing pulse mode 70, the switch logic 69 is then controlled by the excursion and dwell time signals derived from the dwell converter 33 so that the welding current servo 40 will provide current in accord with the lower wave form of FIG. 6.

It will be seen from FIG. 8 that the welding current can thus be independently controlled by the low frequency pulse mode generator 22 which control in turn can be automatically tied into the carriage speed or, alternatively, controlled in accord with the selected program governing movement of the torch.

Figure 9:
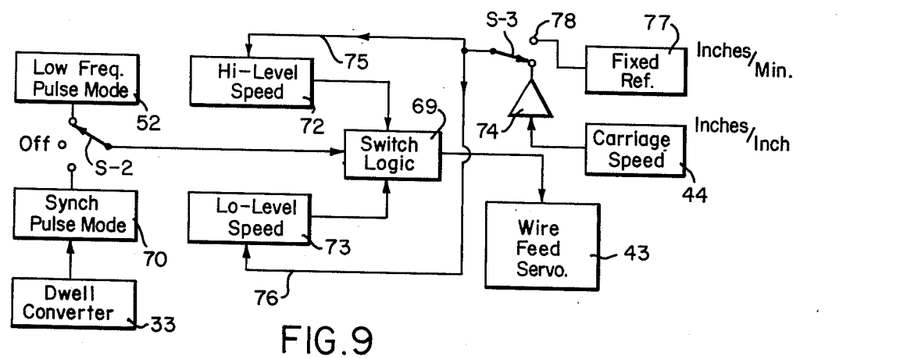
FIG. 9 is a block diagram of a wire feed control means.

Referring now to FIG. 9, there is illustrated in block form a control similar to that described in FIG. 8 which constitutes essentially a wire feed control means connected to the wire feed servo 43. It will be evident that not only is it desirable to control the welding current in accord with the position of the torch but also it is desirable to control the speed or rate at which wire is fed as filler. A further feature of the present invention is the provision of just such a control in order that not too much nor too little wire will be fed when different weld current levels and different torch positions occur.

Essentially, the wire feed control is tied into the welding current control in that when the welding current is high the rate that wire is fed as filler is also high and when the welding current is low the rate that wire is fed as filler is low. Thus there are provided in FIG. 9 a high level speed control 72 and a low level speed control 73, both feedng into a switch logic which may be the same as the switch logic 69 of FIG. 8. The output of the switch logic passes on lead 74 to the wire feed servo 43 and when the switch logic is controlled by the low frequency pulse mode generator 52 as by means of a second switch S-2, the wire will be fed at a high speed during high current levels and at a low speed during low current levels.

Similarly, when the switch S-2 is placed on the synchronization pulse mode block 70, the switch logic 69 is controlled in accord with the selected program so that again the wire feed will be at a high speed during high current levels and at a low speed during low current levels, being fed in accord with the current wave form shown in the lower portion of FIG. 6.

It is also desirable to control the overall average speed that wire is fed in accord with the carriage speed; that is, the speed at which the torch is moved along the weld path in the direction of the weld path.

This control may be accomplished in the circuit of FIG. 9 by the carriage speed means block 44 passing through a buffer amplifier 74 and a third switch S-3 through common leads 75 and 76 to the high and low level speed controls 72 and 73. The high and low speeds are thus simultaneously changed in accord with the carriage speed.

In the event it is desired to control the wire feed speed independently of the carriage speed, the switch S-3 may be thrown to connect to a fixed reference 77 having an output terminal 78. This reference signal may be calibrated in inches per minute of wire feed. By having the switch S-3 connected to the carriage speed means 44, the average speed of wire feed is effectively automatically controlled to read out in inches of wire per inch of carriage movement.

Figure 10:
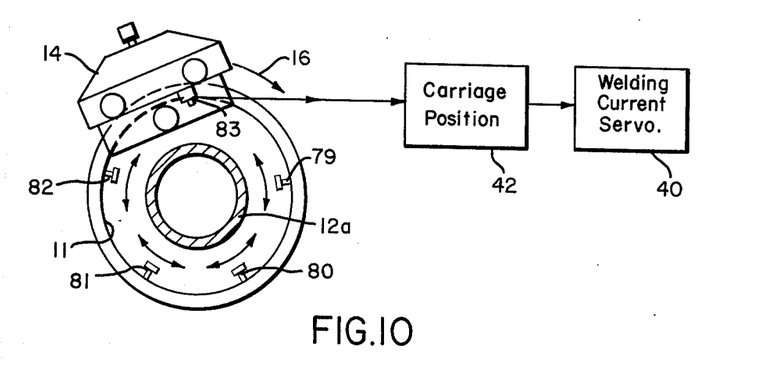
FIG. 10 illustrates one means of controlling welding current levels in accord with the position of the carriage on a pipe section to be welded.

Referring now to FIG. 10, there is illustrated one manner of controlling the average welding current supplied by the welding current servo 40 in accord with the position of the carriage 14 on the track 11. It will be recalled that this control was briefly mentioned in FIG. 5 wherein the carriage position means 42 was described as connected to the welding current servo 40.

In the case of pipe welding wherein the carriage 14 shown in FIG. 10 completely traverses around the track while the pipe section 12a is stationary, it will be evident that when the carriage is in an underneath position gravity acting on molten metal would tend to cause the metal to flow away from the weld path. Thus, it would be desirable to decrease the amount of heat when the carriage is in the upside-down positions to render the molten metal more viscous and thus less likely to "drip." Towards this end, a programming of the carriage position can be accomplished by providing small "dogs" or projections such as indicated at 79, 80, 81, and 82 at strategic circumferential positions on the track 11. The actual circumferential positions of each of the "dogs" can be adjusted as indicated by the double-headed arrows.

The various dogs are arranged to trip a micro switch 83 on the carriage 14 which provides a signal to the carriage position means 42 to in turn vary the level of the welding current from the welding current servo 40.

Thus, when the carriage is approaching a (90°) position to the right so that the switch 83 engages the first "dog" 79, the welding current can be slightly reduced to avoid dripping. Further, as the carriage progresses around the underside of the weld path, the dogs 80 and 81 can effect further changes in the welding current and as the carriage moves up around the left side of the pipe as viewed in FIG. 10, the "dog" 82 can restore the welding current to its higher level when the carriage is traversing over the top portion of the pipe.

One final control feature of the present invention briefly mentioned heretofore will now be described in somewhat greater detail. This control concerns the arc voltage between the torch tungsten and the weld itself. It is desirable to adjust the distance of the torch towards or away from the surface of the members to be welded in accord with the current level supplied to the torch in order to maintain the arc voltage substantially constant. When a low frequency pulse mode is utilized to control the welding current as described in conjunction with the upper wave form of FIG. 6, the high and low level currents are used to control the arc voltage servo resulting in essentially an oscillation of the torch up and down radially relative to the pipe axis as the current levels change. This type of arc voltage control is conventionally used by others. However, in accord with the present invention, rather than have the torch oscillate up and down, the arc voltage is sampled only during the normal high current level or weld current time and is not sampled while the current is at the low or background level. Thus, the sample control 71 of FIG. 8 as described heretofore samples only the high level current to control the arc voltage servo 22 and as a consequence, in this mode, a constant arc length is essentially maintained and radial osciallation is eliminated.

Summarizing the important features of the entire weld system of this invention, there are provided, first, a torch position program generating means wherein the excursion time, amplitude, and individual dwell times of the torch relative to the weld path can be selected as well as an amplitude build up and let down at the start and finish of the welding operation.

Second, the welding current supplied to the torch is controlled in accord with the selected torch position program and in addition in accord with the carriage position.

Third, the rate of wire feed by the wire feed servo is controlled in accord with the selected program and in addition can be automatically controlled by the carriage speed, the inches of wire feed being directly controlled by the inches of carriage movement.

Fourth, there is provided a center control means for accurately centering the torch relative to the weld path as well as a vernier control to enable manual accurate tracking of the weld path.

Finally, there is provided the torch arc voltage servo control which samples only the high current levels to that adjustment of the distance of the torch from the weld path is effected and held substantially constant rather than following an oscillating movement as has characterized the prior art.

It is to be understood that while the particular embodiment set forth and described has to do with pipe welding, the various principles of programming and control as described are applicable to the automatic welding of a weld path extendng along flat surfaces or in path directions other than circular.

What is claimed is:
1. An automatic arc arc welding system comprising, in combination:
   a. a track positionable adjacent to a weld path on a member to be welded;
   b. a carriage coupled to said track;
   c. a carriage motor on the carriage for moving it along the track at a given speed so that the carriage follows along the path;
   d. a welding torch coupled to said carriage;
   e. a torch motor on the carriage which when energized causes excursion movement of the torch in a direction perpendicular to the direction of motion of the carriage;
   f. amplitude control signal generating means for said torch motor to provide a desired amplitude of excursion of said torch;
   g. excursion time control signal generating means for said torch motor to provide a desired excursion time for the torch to travel between the limits of the desired amplitude;
   h. left and right dwell time control signal generating means for said torch for individually providing desired left and right dwell times of the torch at the left and right limits of the torch excursion on the left and right sides of the weld path respectively, whereby the selected amplitude, excursion time, and left and right dwell times may be automatically controlled;

i. welding current servo means for supplying welding current to said torch;

j. welding current control means connected to and controlling said welding current servo means to provide current to the torch, said welding current control means including means for providing low frequency current pulses alternating between adjustable high and low current levels, the frequency and duty cycle of the high current level being independently adjustable, said means comprising in combination a high level current source; a low level current source; a switch logic means connecting said high level current source and low level current source to said welding current servo so that when said switch logic means is switched back and forth the high level current source and low level current source are alternately applied to the welding current servo; means for generating a series of pulses at a frequency proportional to the carriage speed in inches per second divided by a given number of pulses per inch as set into said system; first and second counters connected to receive said pulses at their inputs; and a flip-flop circuit having set and reset terminals connected respectively to the outputs of said first and second counters, said first counter automatically resetting itself and providing an output pulse to said flip-flop when a given number of pulses have been counted, and said second counter providing an output after a given count is achieved less than said first mentioned count to reset said flip-flop, said duty cycle being set into said second counter, said flip-flop connecting to said switch logic means to alternately pass said high level current source and low level current source in accord with the selected counts for said first and second counters; and, k. means automatically responsive to the torch position connected to said means for generating welding current so that the high level current occurs during the left and right dwell times and the low level current occurs during the excursion times of said torch.

2. A system according to claim 1, including manually controllable centering means providing center control signals to said torch motor for enabling adjustment of the center position of the torch halfway between its excursion limits to coincide with the center of the weld path so that an operator can cause the center position of the torch to track accurately the center of the weld path as said carriage moves along the weld path.

3. A system according to claim 1, including start and finish slope time means for individually controlling the rate of build up and let down of excursion movements of said torch across said weld path during the beginning and ending periods of welding at the beginning and ending portions of said weld path, respectively.

4. A system according to claim 1, including wire feed servo means on said carriage mounted for movement with said torch for providing filler during a welding operation; and wire feed control means responsive to the torch position such that the wire is fed at a high level speed during the left and right dwell times when the current level is high and at a low level speed during the excursion times of said torch when the current level is low.

5. A system according to claim 1, including a torch arc voltage servo on said carriage moving the torch towards and away from the path in a direction perpendicular to the surface of the member to be welded; and a sample control circuit connected to said welding current control means to automatically adjust the distance of the torch from the weld surface in accordance with said high current level to maintain the arc voltage constant during the left and right dwell times.

* * * * *